United States Patent
Huang

[11] Patent Number: 5,779,420
[45] Date of Patent: Jul. 14, 1998

[54] STRIP FOR SUPPORTING NAILS

[76] Inventor: Shih Chang Huang, No. 134, Yiau San Street, San Min Chu, Kaoshiung, Taiwan

[21] Appl. No.: 757,963

[22] Filed: Nov. 25, 1996

[51] Int. Cl.[6] .................................................. F16B 15/08
[52] U.S. Cl. .................................... 411/442; 206/347
[58] Field of Search .............................. 411/442, 443, 411/444, 966; 206/347

[56] References Cited

U.S. PATENT DOCUMENTS

| | | | |
|---|---|---|---|
| 1,071,406 | 8/1913 | Engel | 411/443 |
| 3,693,220 | 9/1972 | Pabich | 411/444 |
| 5,509,768 | 4/1996 | Hon | 411/444 |
| 5,522,687 | 6/1996 | Chen | 411/442 |

*Primary Examiner*—Flemming Saether
*Attorney, Agent, or Firm*—Charles E. Baxley, Esq.

[57] ABSTRACT

A strip includes a number of holes for engaging with fasteners and includes a number of shoulders formed around the holes for decreasing the contact area between the strip and the fasteners and for increasing the resilience applied to the fasteners. The strip includes a number of cylindrical walls for forming the holes and includes a number of slits formed in the shoulders and ending at the cylindrical walls for increasing a resilience of the shoulders. The strip includes a number of openings communicating with the slits for increasing the resilience of the shoulders.

1 Claim, 2 Drawing Sheets

STRIP FOR SUPPORTING NAILS

BACKGROUND OF THE INVENTION

1. Field of the Invention

The present invention relates to a strip, and more particularly to a strip for supporting nails.

2. Description of the Prior Art

Typical strips for supporting nails comprise a strip body having a number of holes formed therein for engaging and for supporting nails therein. The strips are engaged in a nailing or stapling mechanism for supplying the nails into the nailing mechanism and for allowing the nails to be driven out of the strips. However, the strip will be broken when the nails are punched out of the strip.

The present invention has arisen to mitigate and/or obviate the afore-described disadvantages of the conventional strips.

SUMMARY OF THE INVENTION

The primary objective of the present invention is to provide a strip for preventing the strip body to be broken when the nails are driven out of the strip body.

In accordance with one aspect of the invention, there is provided a strip comprising a strip body including a plurality of holes for engaging with fasteners, the strip body including a plurality of shoulders formed around the holes respectively, the shoulders each including an inner peripheral portion for engaging with the fasteners and for decreasing a contact area between the strip body and the fasteners.

The strip body includes a plurality of cylindrical walls for defining the holes, and includes a plurality of slits formed in the shoulders and ending at the cylindrical walls for increasing a resilience of the shoulder, and includes a plurality of openings communicating with the slits for increasing the resilience of the shoulders.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
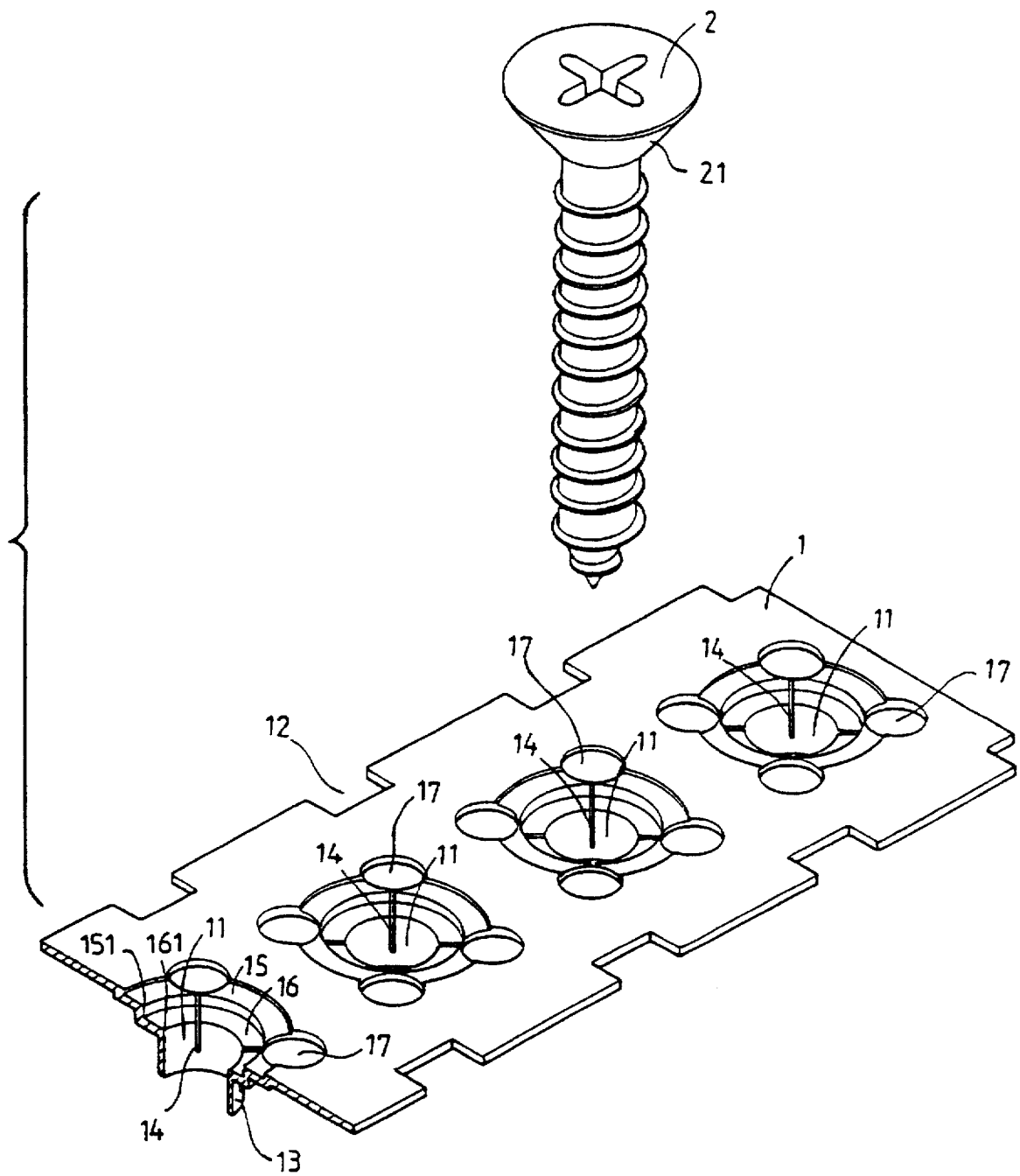
FIG. 1 is a partial perspective view of a strip in accordance with the present invention.
Figure 2:
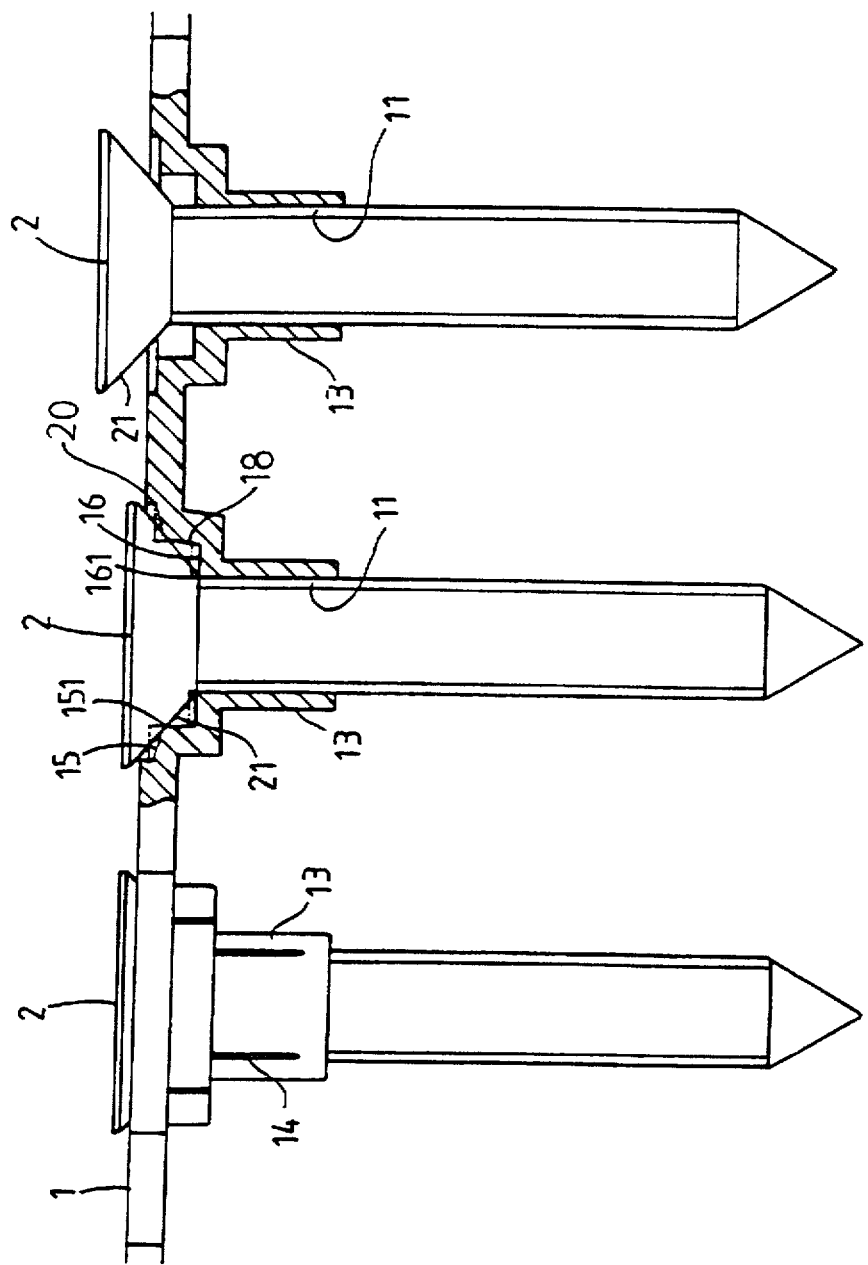
FIG. 2 is a partial cross sectional view of the strip, illustrating the application of the strip.

Referring to the drawings, a strip in accordance with the present invention comprises a strip body 1 including two side edges each having a number of notches 12 formed therein for engaging with a nailing mechanism and for allowing the strip body 1 to be driven by the nailing mechanism. The strip body 1 includes a number of holes 11 formed therein and each defined by a inner first cylindrical wall (13) joined to a first shoulder portion (16) which is joined to an intermediated wall (18). The intermediate wall (18) is joined to a second shoulder portion (15) which in turn is joined to a third wall (20). The two shoulders 15, 16 are formed between the strip body 1 and the respective cylindrical wall 13 or formed around each of the holes 11. The shoulders 15, 16 each includes an inner peripheral portion 151, 161 for engaging with the cone-shaped head 21 of the nail or screw 2 and for decreasing the engaging area between the head 21 and the strip 1, such that the head 21 can be resiliently supported in place. The shoulders 15, 16 include one or more slits 14 formed therein and ending at the cylindrical walls 13 so as to further increase the resilience applied onto the head 21 of the screw 2. The strip body 1 further includes one or more openings 17 communicating with the slits 14 respectively for further increasing the resilience of the shoulders 15, 16 and for allowing the screws 2 to be easily disengaged from the strip body 1.

Accordingly, the strip includes a configuration for resiliently supporting fasteners and for allowing the fasteners to be easily disengaged from the strip.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A strip body of an elongate tape shape having an outer surface and at least one longitudinal side provided with a plurality of transporting notches spaced equidistantly;

a plurality of holes formed in the body and terminating in the outer surface and spaced apart equidistantly along the outer surface for engaging with fasteners;

each of said holes defined by an inner first cylindrical wall normal to the outer surface, the first cylindrical wall being joined in turn, forming a first corner, to a first shoulder parallel to the outer surface; the first shoulder being joined in turn to an intermediate wall normal to the outer surface; the intermediate wall being joined in turn, forming a second corner, to a second shoulder parallel to the outer surface; the second shoulder being joined in turn to a third wall normal to the outer surface and terminating at the outer surface, the shoulders for engaging resiliently with the fasteners and for decreasing contact area between the strip and the fasteners;

the strip including a plurality of slits, in planes normal to the outer surface, through said first and second shoulders and inner first, second and third walls for further increasing resilience of the shoulders; and the strip body including a plurality of openings communicating with said slits for further increasing the resilience of the shoulders.

* * * * *